United States Patent
Kim et al.

(10) Patent No.: US 10,374,990 B2
(45) Date of Patent: Aug. 6, 2019

(54) MESSAGE PROCESSING METHOD AND ELECTRONIC DEVICE SUPPORTING THE SAME

(71) Applicant: Samsung Electronics Co., Ltd., Suwon-si, Gyeonggi-do (KR)

(72) Inventors: Kyu Hyun Kim, Suwon-si (KR); Min O Kim, Gumi-si (KR); In Soo Kim, Seoul (KR); Jun Ho You, Goyang-si (KR); Sang Min Bae, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 14/628,471

(22) Filed: Feb. 23, 2015

(65) Prior Publication Data
US 2015/0244659 A1    Aug. 27, 2015

(30) Foreign Application Priority Data
Feb. 23, 2014   (KR) .................. 10-2014-0021004

(51) Int. Cl.
*H04L 12/58*     (2006.01)

(52) U.S. Cl.
CPC ............ *H04L 51/066* (2013.01); *H04L 51/38* (2013.01)

(58) Field of Classification Search
CPC .................................................... H04L 51/066
USPC ................................................ 709/206–207
See application file for complete search history.

(56) References Cited

U.S. PATENT DOCUMENTS

| 7,240,066 B2 | 7/2007 | Burchall et al. |
| 8,666,374 B2 | 3/2014 | Blades |
| 8,856,948 B1* | 10/2014 | Robison .................. G06F 21/60 726/26 |
| 2003/0187939 A1* | 10/2003 | O'Brien .................. H04L 51/18 709/206 |
| 2004/0237046 A1* | 11/2004 | Burchall ............. G06F 17/2217 715/256 |

(Continued)

FOREIGN PATENT DOCUMENTS

| CN | 102648641 A | 8/2012 |
| KR | 10-2008-0034072 A | 4/2008 |
| KR | 10-2010-0007192 A | 1/2010 |

OTHER PUBLICATIONS

3rd Generation Partnership Project; "Digital cellular telecommunications system (Phase 2+); Universal Mobile Telecommunications System (UMTS);Technical realization of Short Message Service (SMS)"; (3G PP TS 23.040 version 91.0 Release 9; ETSI TS 123 040 V9.1.0; 3GPP, 650 Route des Lucioles F-06921 Sophia Antipolis Cedex—France; Jan. 1, 2010 (Jan. 1, 2010), XP014045192.

(Continued)

*Primary Examiner* — Jason D Recek
(74) *Attorney, Agent, or Firm* — Jefferson IP Law, LLP

(57) ABSTRACT

A message processing method and an electronic device for supporting the same are provided. The electronic device includes a communication interface configured to receive a message including a plurality of pages, and a control module configured to process the received message, wherein, if undefined data exists among data contained in a specific page of the plurality of pages, the control module combines at least a part of data contained in a next page that is sequential to the specific page with the undefined data.

20 Claims, 11 Drawing Sheets

(56) References Cited

U.S. PATENT DOCUMENTS

| | | | | |
|---|---|---|---|---|
| 2009/0276696 | A1* | 11/2009 | Kapoor | G06F 17/30893 |
| | | | | 715/252 |
| 2012/0231774 | A1 | 9/2012 | Blades | |
| 2014/0025756 | A1 | 1/2014 | Kamens | |
| 2014/0106795 | A1* | 4/2014 | Blades | G06F 17/214 |
| | | | | 455/466 |
| 2014/0331125 | A1* | 11/2014 | Tigchelaar | G06F 17/211 |
| | | | | 715/249 |
| 2016/0057090 | A1* | 2/2016 | Faaborg | H04W 4/206 |
| | | | | 709/206 |

OTHER PUBLICATIONS

Wikipedia; "Universal Coded Character Set"; "http s ://en.wikipedia. orglw/index.php?title= Universal_ Coded_Character_ Set&oldid= 589474260"; Jan. 6, 2014 (Jan. 6, 2014), XP055412677.

Wikipedia, "UTF-16"; "https://en.wikipedia.orglw/index.php?title= UTF-16&oldid=590937882"; Jan. 16, 2014 (Jan. 16, 2014), XP055412678.

3GPP; 3rd Generation Partnership Project; Technical Specification Group Core Network and Terminals; Technical realization of the Short Message Service (SMS); Release 9; 3GPP TS 23.040; V9.1.0; Sep. 2009.

Chinese Office Action with English translation dated Oct. 18, 2018; Chinese Appln. No. 201580009989.5.

\* cited by examiner

MESSAGE PROCESSING METHOD AND ELECTRONIC DEVICE SUPPORTING THE SAME

CROSS-REFERENCE TO RELATED APPLICATION(S)

This application claims the benefit under 35 U.S.C. § 119(a) of a Korean patent application filed on Feb. 23, 2014 in the Korean Intellectual Property Office and assigned Serial number 10-2014-0021004, the entire disclosure of which is hereby incorporated by reference.

TECHNICAL FIELD

The present disclosure relates to handling of messages.

BACKGROUND

With the development of digital technology, various electronic devices, such as mobile communication devices, personal digital assistants (PDAs), electronic organizers, smartphones and tablet Personal Computers (PCs), for supporting telecommunications and personal information processing have recently been released on the market. Such electronic devices provide a function of transmitting/receiving text messages.

The above information is presented as background information only to assist with an understanding of the present disclosure. No determination has been made, and no assertion is made, as to whether any of the above might be applicable as prior art with regard to the present disclosure.

SUMMARY

An electronic device of the related art automatically converts a text message into a multipage, which may also be referred to as a plurality of pages and/or a multipage message, format to transmit the text message, if the size of content data of the text message is larger than a certain value. However, in the case of a text message transmitted in the multipage format, an error may occur while the text message is encoded and/or a received text message is decoded.

Aspects of the present disclosure are to address at least the above-mentioned problems and/or disadvantages and to provide at least the advantages described below. Accordingly, an aspect of the present disclosure is to provide a message processing method for processing a multipage text message so that the content data of the text message is encoded and/or decoded normally and an electronic device supporting the same.

In accordance with an aspect of the present disclosure, an electronic device is provided. The electronic device includes a communication interface configured to receive a message including a plurality of pages and a control module configured to process the received message, wherein, if undefined data exists among data contained in a specific page of the plurality of pages, the control module combines at least a part of data contained in a next page that is subsequent to the specific page with the undefined data.

In accordance with another aspect of the present disclosure, an electronic device is provided. The electronic device includes a control module configured to combine at least a part of data contained in a next page that is subsequent to a specific page with undefined data if the undefined data is contained in the specific page of a created multipage and a communication interface configured to transmit a multipage message including the combined data.

In accordance with another embodiment of the present disclosure, a message processing method is provided. The message processing method includes determining whether undefined data is contained in a specific page of a multipage message and combining at least a part of data contained in a next page that is subsequent to the specific page with the undefined data if the undefined data is contained.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modification of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
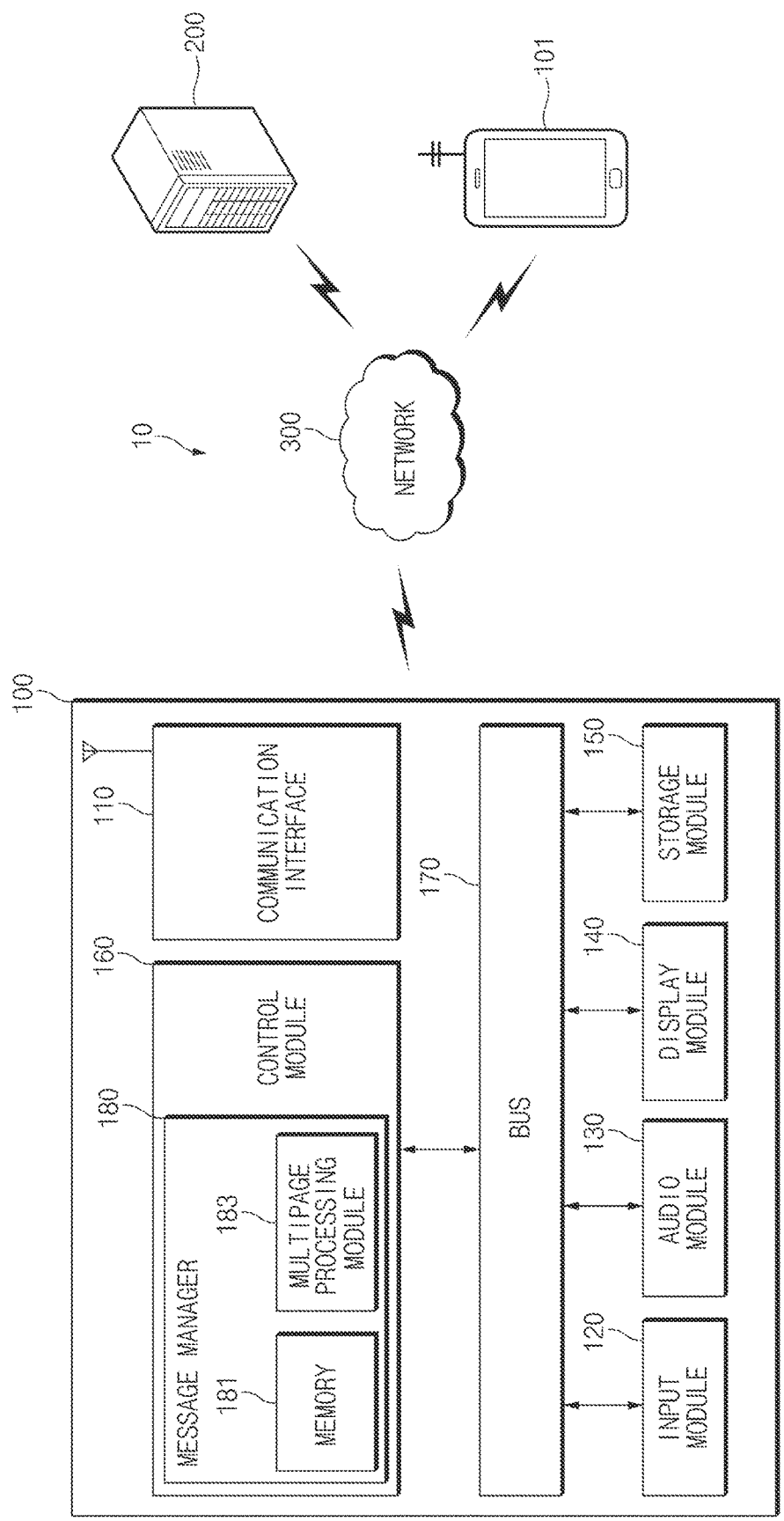
FIG. 1 illustrates a message processing environment according to an embodiment of the present disclosure.

FIG. 1 illustrates a message processing environment according to an embodiment of the present disclosure.

Referring to FIG. 1, a message processing environment 10 may include an electronic device 100, a network 300, another electronic device 101, and a server device 200.

The message processing environment 10 may support the electronic device 100 so that the electronic device 100 may transmit a message including a plurality of pages, which may also be referred to as a multipage, a multipage message, or a plurality of pages, to the other electronic device 101. Furthermore, the message processing environment 10 may support the other electronic device 101 so that the other electronic device 101 may transmit a message including a plurality of pages to the electronic device 100. According to an embodiment, in this operation, the electronic device 100 may process pieces of undefined data, e.g., data not defined with determined code information applied to message processing, in the message to transmit the pieces of undefined data to the other electronic device 101. For example, the electronic device 100 may collect pieces of undefined data from the contents included in the plurality of pages and then may add the pieces of undefined data to a single page so as to transmit the pieces of undefined data. According to an embodiment, upon receiving the message including the plurality of pages from the other electronic device 101, the electronic device 100 may check pieces of undefined data in the contents of the message, or in other words, may determine whether the pieces of undefined data exist in the contents of the message. If the pieces of undefined data exist in the contents of the message, the electronic device 100 may combine and/or integrate the pieces of undefined data to convert, e.g., decode, the pieces of undefined data on the basis of the determined code information applied to message processing.

The network 300 may establish a communication channel between the electronic device 100 and the server device 200 and establish a communication channel between the server device 200 and the other electronic device 101. The network 300 may support data transmission through a mobile telecommunications-based communication channel or a wireless fidelity (WiFi)-based communication channel using a base station or an access point (AP). According to an embodiment, the network 300 may transmit the message including the plurality of pages from the electronic device 100 to the server device 200. The network 300 may support the server device 200 so that the server device 200 may transmit the plurality of pages from the electronic device 100 to the other electronic device 101. According to an embodiment, the network 300 may transmit the message including the plurality of pages from the other electronic device 101 to the server device 200. The network 300 may support the server device 200 so that the server device 200 may transmit the plurality of pages from the other electronic device 101 to the electronic device 100. Although, according to an embodiment of the present disclosure, messages are transmitted through the network 300 in the message processing environment 10, the present disclosure is not limited thereto. For example, the electronic device 100 and the other electronic device 101 may establish a short-range communication channel and/or a direct communication channel therebetween to directly transmit messages to each other without using the network 300.

The server device 200 may establish a communication channel to the network 300. The server device 200 may receive a message from the electronic device 100 and/or the other electronic device 101. The server device 200 may check and/or determine address information of the received message, and may transmit the received message to the other electronic device 101 and/or the electronic device 100 according to the address information. The server device 200 may include a configuration of a message service center for controlling message transmission. The server device 200 may control transmission of various messages, such as a short message and/or a multimedia message of the message service center. According to an embodiment, the sever device 200 may transmit multipage messages between the electronic device 100 and the other electronic device 101. According to the various embodiments, the above-mentioned processing of undefined data of a multipage may be performed in the server device 200. For example, if undefined data is included in the contents of a multipage message transmitted from the electronic device 100 to the other electronic device 100, the server device 200 may combine the undefined data with other adjacent undefined data so as to process the message. Furthermore, the server device 200 may control transmission of the multipage message from which the undefined data has been removed.

The other electronic device 101 may establish a communication channel on the basis of the electronic device 100 and the network 300. Alternatively, the other electronic device 101 may establish a short-range communication channel and/or a direct communication channel to the electronic device 100 to transmit messages on the basis of the short-range communication channel and/or the direct communication channel. The other electronic device 101 may be the same device as the electronic device 100, e.g., a message transmittable device such as a smartphone and/or a smartwatch.

The electronic device 100 may transmit a message to the other electronic device 101 through the network 300 and the server device 200. The electronic device 100 may receive, from the server device 200, a message transmitted from the other electronic device 101. Alternatively, the electronic device 100 may transmit a message to the other electronic device 101 using a direct communication channel and/or a short-range communication channel. According to an embodiment, in the case where a message to be transmitted includes a plurality of pages, the electronic device 100 may check and/or determine whether undefined data exists in the contents of the pages, e.g., a message body containing contents in a structure including a header and a body. The electronic device 100 may process the undefined data, e.g., arrange the undefined data in a single page, and may convert, e.g., encode, the undefined data, and then may transmit a modified message to the other electronic device 101 directly or via the server device 200. According to an embodiment, in a case where a received message includes a plurality of pages, the electronic device 100 may check and/or determine whether undefined data exists in the contents of the pages, e.g., a message body containing contents in a structure including a header and a body. The electronic device 100 may convert, e.g., decode, the undefined data to allow the undefined data to be output or stored.

As illustrated in FIG. 1, the electronic device 100 may include a communication interface 110, an input module 120, an audio module 130, a display module 140, a storage module 150 and a control module 160. Additionally and/or alternatively, the above-mentioned modules of the electronic device 100 may be included in the other electronic device 101.

The communication interface 110 may support a communication function of the electronic device 100. In a case where the electronic device 100 supports a plurality of communication schemes, a plurality of communication modules and/or a plurality of communication interfaces may be included. For example, the communication interface 110 may establish a communication channel to the other electronic device 101 via the network 300. In a case where the electronic device 100 supports a base station-based communication scheme, the communication interface 110 may include a communication module using a 3G/4G Long Term Evolution (LTE) network and a WiFi communication module supporting an AP-based communication scheme. Furthermore, the communication interface 110 may include a short-range communication module (not shown) and/or a direct communication module (not shown) for establishing a direction communication channel to the other electronic device 101. The short-range communication module and/or the direct communication module may include at least one of various communication modules, such as a WiFi direct communication module, a Bluetooth communication module and a ZigBee communication module.

According to an embodiment, the communication interface 110 may transmit a message of a multipage or a plurality of pages to the other electronic device 101 via the network 300. Alternatively, the communication interface 110 may directly transmit the multipage message to the other electronic device 101. The communication interface 110 may receive a multipage message from the other electronic device 101. Here, the communication interface 110 may receive the multipage message via the server device 200 connected to the network 300. For example, the other electronic device 101 may transmit the multipage message to the server device 200 connected to the network 300, and the server device 200 may transmit the multipage message to the electronic device 100 through the communication interface 110.

The input module 120 may generate an input signal of the electronic device 100. The input module 120 may include a physical key button, e.g., a home key, a side key and/or a power key, a jog key, a keypad and the like. The input module 120 may include a virtual key pad output to the display module 140 as an input device. The input module 120 may generate an input signal for enabling a specific device element included in the electronic device 100, such as the display module 140 and/or the communication interface 110. According to an embodiment, the input module 120 may generate an input signal for turning on/off the electronic device 100, an input signal for activating a message writing window, an input signal for writing a message, and/or an input signal for transmitting a message, in response to a user input. The input module 120 may generate an input signal for checking and/or determining a message received from the other electronic device 101 and/or an input signal for storing or deleting a received message, in response to a user input.

The audio module 130 may include a module for processing audio data. In detail, the audio module 130 may include one or more speakers and/or one or more microphones. The audio module 130 may output, for example, audio data for notifying reception of a message, a sound effect related to selection and checking and/or determining of a received message, and a sound effect related to deletion or storing of a message. According to an embodiment, the audio module 130 may output an alarm sound and/or a guide voice if a message extends over multiple pages when the message is created.

The display module 140 may output various screens related to operation of the electronic device 100. For example, the display module 140 may output a lock screen and/or a standby screen. The display module 140 may output a specific function performing screen, such as a sound playback application execution screen, a message reception notifying screen, a message content checking screen, a menu screen, and/or a screen on which at least one function item is arranged. According to an embodiment, the display module 140 may output a message writing screen. The message writing screen may include an area to which a written message is output, a virtual keypad area for supporting input of a character, and an information input area for inputting information of the other electronic device 101 that is to receive a message. According to an embodiment, the display module 140 may provide a message writing screen of a single page. For example, the display module 140 may output a message writing screen supporting input of a certain length of characters, e.g., 140-byte characters, according to a regulation set, a specification set, and/or a standard set, by a messaging service provider and/or by self-regulation of the electronic device 100. The display module 140 may output a virtual key input pad for writing a text message. The display module 140 may display automatic multipage conversion if more than 140 bytes of data is input, while outputting a text message.

According to an embodiment, when a message is received from the other electronic device 101, the display module 140 may output the message. Here, the display module 140 may output a screen of a message that has undergone undefined data processing in response to control by the control module 160.

The storage module 150 may store various information related to operation of the electronic device 100. For example, the storage module 150 may store a specific application to be executed in the electronic device 100 and data for executing the application. According to an embodiment, the storage module 150 may store at least one message. Furthermore, the storage module 150 may store at least one multipage message. When a request for retrieving a stored message is made, the storage module 150 may provide a message list to the display module 140 with respect to the request. According to an embodiment, the storage module 150 may store a multipage message of which pieces of undefined data have been processed by the control module 160. The multipage message may include at least one of a message transmitted from the other electronic device 101 and a message created in the electronic device 100.

A bus 170 may support data transmission/reception among the modules of the electronic device 100, e.g., the communication interface 110, the input module 120, the audio module 130, the display module 140, the storage module 150 and the control module 160. For example, the bus 170 may transfer an input signal input through the input module 120 to the control module 160. The bus 170 may transfer a multipage message received by the communication interface 110 to at least one of the control module 160, the display module 140 and the storage module 150. The bus 170 may transfer, to the storage module 150, a multipage message of which pieces of undefined data have been processed according to control by the control module 160.

The control module 160 may process and transmit data or control signals related to operation of the electronic device 100. According to the various embodiments, when a multipage message including pieces of undefined data is received through the communication interface 110, the control module 160 may store the multipage message in the storage module 150 temporarily and/or semi-permanently. When the multipage message is requested to be output to the display module 140, the control module 160 may process the pieces of undefined data. The control module 160 may allow the multipage message, of which the pieces of undefined data have been processed, to be stored in response to a request for storing the multipage message. According to the various embodiments, when the multipage message, including the pieces of undefined data, is received through the communication interface 110, the control module 160 may process the pieces of undefined data. The control module 160 may store the multipage message, of which the pieces of undefined data have been processed, in the storage module 150 temporarily and/or semi-permanently. When the multipage message is requested to be output to the display module 140, the control module 160 may read the multipage message, of which the pieces of undefined data have been processed, from the storage module 150 so as to allow the multipage message to be output to the display module 140.

The control module 160 may include a message manager 180 for processing messages. The message manager 180 may include a memory 181 and a multipage processing module 183. According to an embodiment, when a message is received, the message manager 180 may check a header area of the message to determine whether the message is a multipage message including a plurality of pages. When a multipage message is received, the message manager 180 may transfer the multipage message to the multipage processing module 183.

The message manager 180 may temporarily store a received message in the memory 181. For example, the memory 181 may store at least a part of multibit or multibyte Unicode content included in a multipage message. The memory 181 may store information related to the multibyte Unicode content.

The message manager 180 may configure a user input in the form of a message, e.g., a text message, in a message writing environment. The message manager 180 may determine whether to generate a single-page message or a multipage message on the basis of an amount of data from the user input. For example, the message manager 180 may check and/or determine a message standard to allow a multipage message to be automatically generated if the amount of data from the user input exceeds an amount of message contents allowable in one page. The message manager 180 may generate and/or restore a message according to information received from the multipage processing module 183. The message manager 180 may be a telephony module (not shown) arranged in a framework layer of the control module 160.

According to an embodiment, the control module 160 may process messages on the basis of a modem layer, radio interface layer (RIL) layer, framework layer and/or application layer structure. A modem may be arranged in the modem layer to transmit/receive signals. The RIL layer may serve to transmit data to the modem layer that is a physical layer and/or transfer a message, e.g., a multipage message, received from the modem layer to the framework layer. The above-mentioned telephony module may be arranged in the framework layer, wherein the telephony module may include the message manager 180 of the various embodiments. The telephony module may include a multibyte Unicode content management unit, e.g., the multipage processing module 183. A message application, e.g., at least one of a message writing application, a received message search application and a message receiving application, may be arranged in the application layer. The message manager 180 may send a reception notification to the message application when a multipage message is received. If the multipage message includes undefined data, the message manager 180 may process the undefined data and may transfer the processed multipage message to the message application. The above-mentioned operation may be performed by the multipage processing module 183, and a result of the operation may be transferred to the message application. According to the various embodiments, the multipage processing module 183 may be designed to be included in the message application. Furthermore, according to the various embodiments, the multipage processing module 183 may be arranged in the RIL layer to search for and process undefined data when a multipage message is received.

With respect to message transmission, the multipage processing module 183 may generate a message to be transmitted to the other electronic device 101 on the basis of data transferred by the message application. In this operation, the multipage processing module 183 may check and/or determine a message standard, e.g., 80 bytes or 140 bytes, a code type of data, and an amount of input data to monitor whether a single page or a multipage is generated. If application of a multipage is required, the multipage processing module 183 may check and/or determine whether undefined data is generated as defined data is arranged in a page boundary area in consideration of an identified data code type and an order of input data. When the multipage processing module 183 determines that the undefined data is generated, the multipage processing module 183 may provide a guide on switching to another data code type and/or may allow a warning message on data insertion to be output.

According to an embodiment, the message manager 180 may process undefined data according to whether a received message is a multipage message and has a set specific code type, e.g., Unicode Transformation Format (UFT)-16) According to an embodiment, if the received message is a multipage message, the message manager 180 may extract pieces of data of a message body area and may integrate and/or combine the extracted pieces of data to perform message processing regardless of whether undefined data exists. Here, the message body area may contain user data input by a user in a received message and/or may contain a message to be transmitted. At the front of the message body area, a message header area including pieces of information for describing the message body area may be arranged.

According to an embodiment, if undefined data exists while the message manager 180 processes a received message, e.g., decoding pieces of data of a message body area using a specific coding scheme to generate a string, the message manager 180 may combine detected undefined data and other undefined data to perform message processing. According to an embodiment, if the received message is a multipage message, the message manager 180 may check and/or determine whether undefined data exists, and may allow processing of the undefined data.

According to an embodiment, when a message is received, the message manager 180 may check and/or determine whether a scheme for defining or converting information, e.g., code information, and/or whether data constituting characters of the message, is a coding scheme in which a plurality of bytes are allocated to a single character or emoticon, e.g., a data converting scheme is based on multibyte Unicode content, such as Unicode UTF-16, 32. If a data defining scheme of the message is the coding scheme for allocating a plurality of bytes, the message manager 180 may check and/or determine whether the message is a multipage message. The message manager 180 may check and/or determine whether a certain area of a page, e.g., a certain number of uppermost or lowermost bytes of the message body area, e.g., two bytes corresponding to a surrogate area size in the case of Unicode UTF-32, is undefined data, according to a data size defined by the coding scheme.

The multipage processing module 183 may detect multibyte Unicode content from the message body area, e.g., a bytes data area of user data, of a multipage message. The multipage processing module 183 may divide the multibyte Unicode content into multiple pieces and/or restore the multibyte Unicode content in consideration of the size of the multibyte Unicode content. The multipage processing module 183 may monitor where the multibyte Unicode content and/or each part of the divided multibyte Unicode content exists in the message body area, which may also be referred to as a user data area. The multipage processing module 183 may manage various pieces of information related to the multibyte Unicode content.

According to the various embodiments, an electronic device may include a communication interface for receiving a message including a plurality of pages, and a control module for checking and/or determining whether undefined data exists among data included in a specific page of the plurality of pages and for combining at least a part of data included in a next page to the specific page with the undefined data if the undefined data exists.

According to the various embodiments, the control module may check and/or determine whether data written in a certain lower area of the specific page is the undefined data and/or whether data written in a certain upper area of the specific page is the undefined data.

According to the various embodiments, the control module may check a data conversion size using data conversion information applied to the page, and may check whether the undefined data exists in a certain area of the page according to the data conversion size information.

According to the various embodiments, the control module may check and/or determine a size of largest data constituting a single character using the data conversion size information, and may assign a size of the certain area of the page according to the data size.

According to the various embodiments, the control module may convert content data of the plurality of pages including the combined data and may allow a character string corresponding to the converted content data to be output.

According to the various embodiments, the control module may include a memory for storing the undefined data and a multipage processing module for combining certain data of the next page and the undefined data stored.

According to the various embodiments, an electronic device may include a control module for checking and/or determining whether undefined data is included in a specific page of a created multipage and for combining at least a part of data included in a next page to the specific page with the undefined data if the undefined data is included, and a communication interface for transmitting a multipage message including the combined data.

According to the various embodiments, if the undefined data is included, the control module may move the undefined data to a next page, and may blank a partial area of the specific page and/or may write specific information in an area where the undefined data is written according to the movement of the undefined data.

According to the various embodiments, the control module may write a message body size value of the specific page, which has been changed due to the combining with the undefined data, in a message header of the specific page.

According to the various embodiments, an electronic device may include a communication interface for receiving a multipage-type message, and a control module for extracting content data from multiple pages of the multipage-type message and for continuously converting the extracted content data to perform message output.

Figure 2:
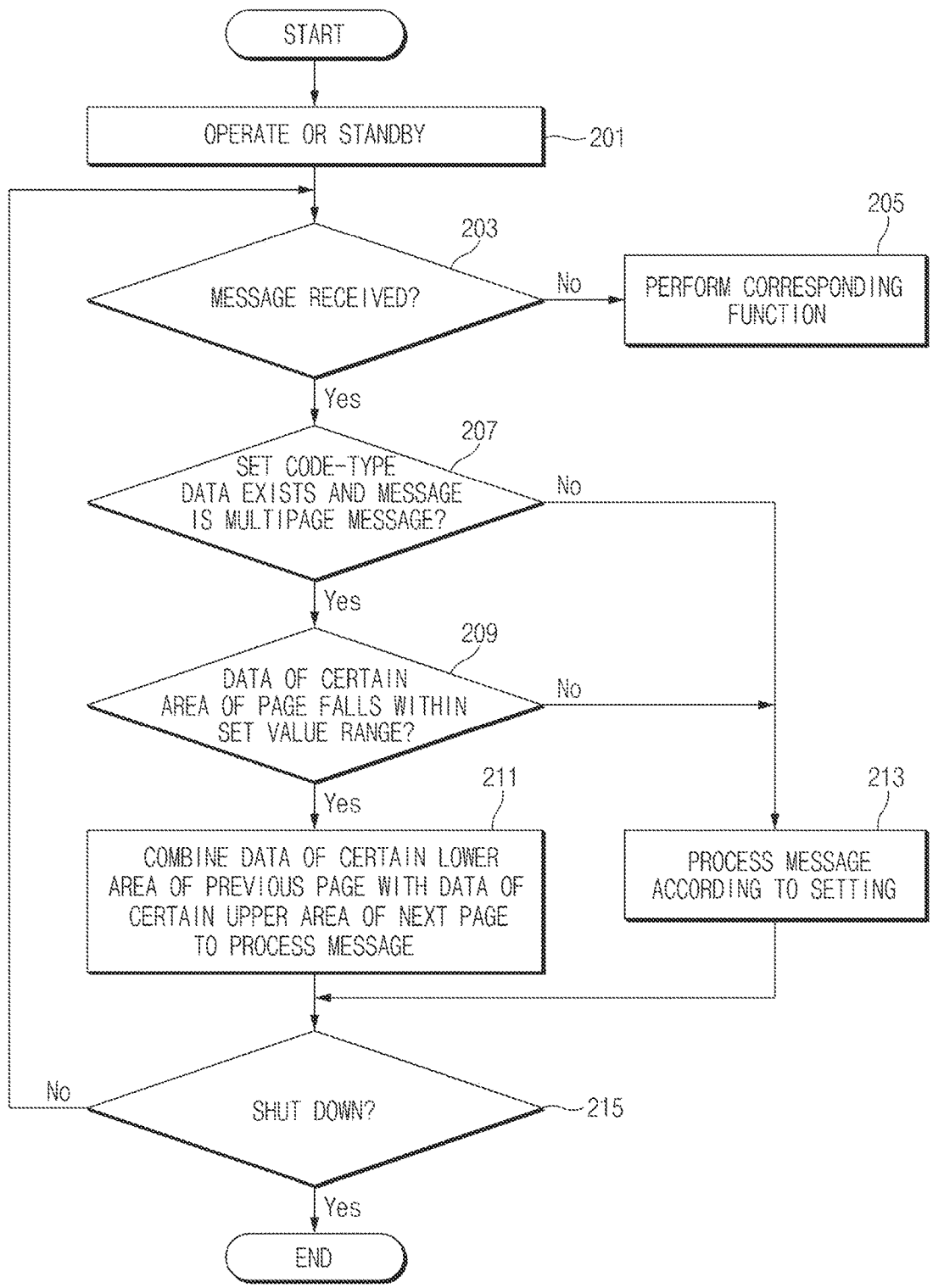
FIG. 2 is a flowchart illustrating a message processing method based on a combination of pieces of data of an undefined area according to an embodiment of the present disclosure.

FIG. 2 is a flowchart illustrating a message processing method based on a combination with pieces of data of an undefined area according to an embodiment of the present disclosure.

Referring to FIG. 2, according to a message processing method according to an embodiment, the control module 160 of the electronic device 100 may control the electronic device 100 to operate or to be in a standby mode, in operation 201. For example, the control module 160 may maintain a sleep mode state, e.g., a state where the display module 140 is turned off, or may allow a lock screen or a standby screen to be output. Alternatively, the control module 160 may support performance of a specific function such as sound playback, file playback, file editing and/or website access, according to schedule information or an input event. The control module 160 may allow the communication interface 100 to remain in a standby state so that the communication interface 110 is able to receive a message.

The control module 160 may check and/or determine whether an event related to message reception occurs in operation 203, or in other words, the control module 160 may check and/or determine whether a message, such as a multimedia message and/or a short message, is received.

If an event related to message reception does not occur in operation 203, the control module 160 may proceed to operation 205 to control performance of a corresponding function according to the type of an event that occurs. Alternatively, if an additional event does not occur, the control module 160 may allow a previous operation state to be maintained, or may control entry to a sleep mode, e.g., a mode for turning off the display module 140, or maintenance of a previous state.

If message reception occurs in operation 203, the control module 160 may check and/or determine whether set code-type data, e.g., data created using a coding scheme in which multiple bytes are allocated to express a single character, such as UTF-16, exists in operation 207. Furthermore, the control module 160 may check and/or determine whether a received message is a multipage message in operation 207. In relation to this operation, the control module 160 may check and/or determine a header area of the received message to determine whether the received message is a multipage message. Here, the control module 160 may first check and/or determine whether the message is a multipage message and then may check and/or determine whether the set code-type data is included. Alternatively, the control module 160 may check and/or determine whether the set code-type data is included in the message and then may check and/or determine whether the message is a multipage message.

In a case where the set code-type data, e.g., UTF-16 data, exists and the received message is a multipage message in operation 207, the control module 160 may check and/or determine whether data of a certain area of a page falls within a set range, or in other words, a set value range, in operation 209. For example, the control module 160 may search pieces of data input to a boundary area of a multipage for a surrogate area assigned by a predefined standard so as to check and/or determine whether data for expressing one character is written normally in one page. Alternatively, the control module 160 may check and/or determine whether data written in a certain area of a page, e.g., a lowermost two byte area of a page, falls within the values defined in Table 1 below. Table 1 shows values of a Unicode surrogate area.

TABLE 1

| D800 | DBFF | 400 | 1024 | High Surrogate Area |
| DC00 | DFFF | 400 | 1024 | Low Surrogate Area |

If the data of the certain area falls within a set range of values in operation 209, the control module 160 may combine data of a certain lower area of a previous page with data of a certain upper area of a next page to process the message, or in other words, to perform message conversion processing in operation 211. In operation 211, the control module 160 may store the data of the certain lower area of the previous page, e.g., undefined data, in the memory 181, and may indicate that the page has a separate character string, e.g., by changing a value of a specific flag and/or register related to message processing. The control module 160 may check and/or determine whether the previous page includes undefined data, e.g., a separate character string, when processing a message of the next page. If the undefined data is included, the control module 160 may combine data of a certain upper area of a current page with the undefined data stored in the memory 181 to perform single character processing. The control module 160 may arrange a character generated by processing the undefined data between the data of the previous page and the data of the next page so as to restore a multipage message.

If the set code-type data does not exist or the received message is not a multipage message in operation 207, then the control module 160 may perform message conversion processing according to a setting in operation 213. For example, if the received message is not a multipage message, the control module 160 may perform message processing according to a single-page message processing scheme. Furthermore, if the data of the certain area does not fall within the set range of values or corresponds to defined data in operation 209, then the control module 160 may perform message processing according to a setting in operation 213.

The control module 160 may check and/or determine whether an event related to shutting down of the electronic device 100 occurs in operation 215. When the event related to the shutting down occurs, the control module 160 may shut down, e.g., turn off, the electronic device 100. If the event related to the shutting down does not occur in operation 215, the process may return to operation 203 so that the control module 160 re-performs operation 203 and the following operations.

According to the various embodiments, a message processing method may include checking and/or determining whether undefined data is included in a specific page of a multipage, and combining at least a part of data included in a next page to the specific page with the undefined data if the undefined data is included.

According to the various embodiments, the checking and/or determining of whether the undefined data is included in the specific page of the multipage may include at least one of checking and/or determining whether data written in a certain lower area of the specific page is the undefined data and checking and/or determining whether data written in a certain upper area of the specific page is the undefined data.

According to the various embodiments, the checking and/or determining of whether the undefined data is included in the specific page of the multipage may include determining data size information of one character defined by at least one character code information included in the specific page, and determining whether the undefined data is included in the certain lower area of the specific page on the basis of the data size information.

According to the various embodiments, the checking and/or determining of whether the undefined data is included in the specific page of the multipage may further include checking character code information of largest data for one character in the at least one character code information included in the specific page, and determining the certain area of the specific page within a value of the largest data.

According to the various embodiments, the method may further include at least one of receiving a text message having the type of the multipage, and decoding content data of the multipage including the combined data to output a character string corresponding to the decoded content data.

According to the various embodiments, the method may further include temporarily storing the undefined data and combining certain data of the next page with the undefined data stored.

According to the various embodiments, the combining may include moving the undefined data to the next page if the undefined data is included.

According to the various embodiments, the method may further include any one of blanking a partial area of the specific page according to movement of the undefined data and writing specific information in an area where the undefined data is written.

According to the various embodiments, the method may include encoding the combined data.

According to the various embodiments, the method may further include writing, in a message header, a size value of a message body changed due to the combining with the undefined data.

Figure 3:
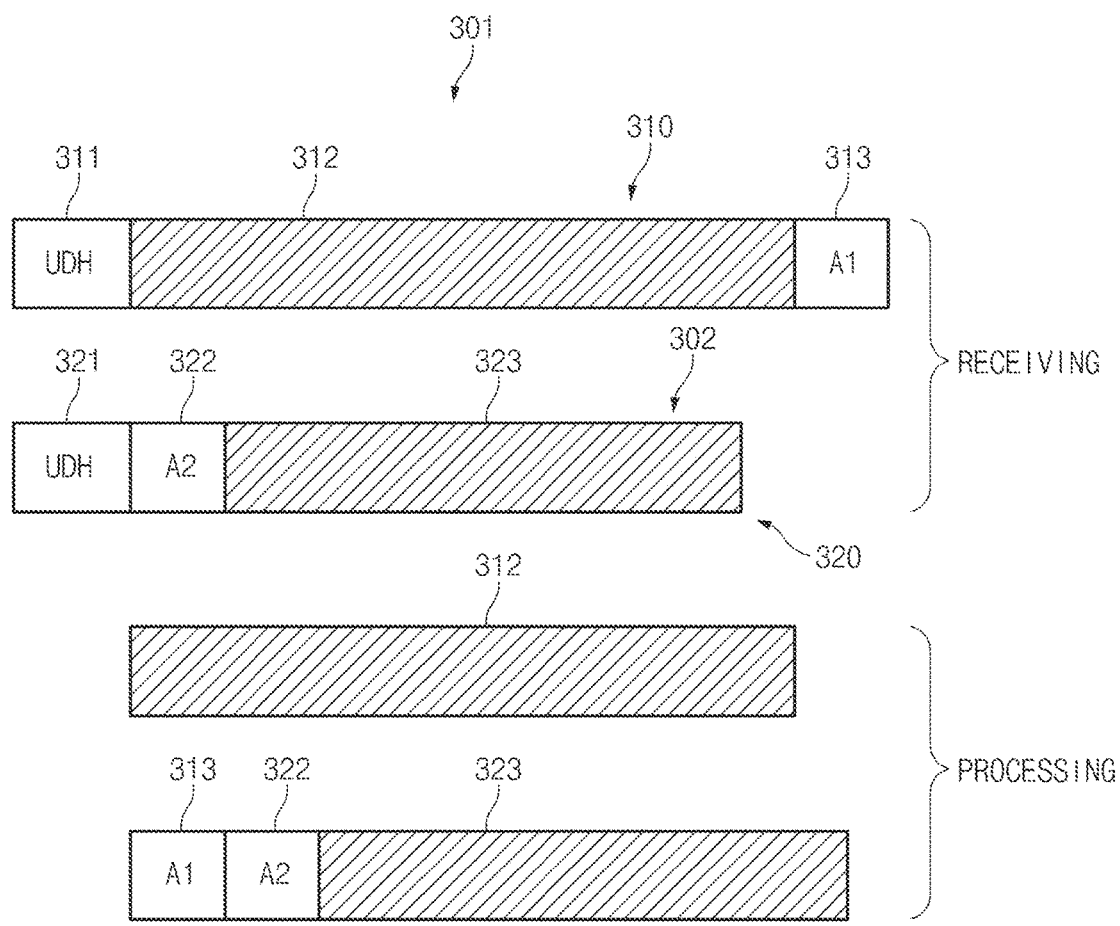
FIG. 3 is a diagram illustrating multipage processing based on combination with an undefined data area according to an embodiment of the present disclosure.

FIG. 3 is a diagram illustrating multipage processing based on combination with an undefined data area according to an embodiment of the present disclosure.

Referring to FIG. 3, the electronic device 100 may receive a multipage message including a page 310 and a page 320. The page 310 may include a message header area 311 and a message body area 301. The message body area 301 may include a defined area 312, where defined code data is arranged, and an undefined area 313, where undefined code data is arranged. The page 320 may include a message header area 321 and a message body area 302. The message body area 302 may include an undefined area 322 where undefined code data is arranged and a defined area 323 where defined code data is arranged.

The message header area 311, which may also be referred to as a user data header (UDH), is arranged at a front of the message body area 301, which may also be referred to as user data, and a message transmitted with one page, e.g., a short message service (SMS), may not include the message header area 311. The message header area 311 is arranged in a multipage message with at least two pages, and may include a reference number, a sequence number, which may refer to a current page, and a message count, which may be a total number of messages. The electronic device 100 may recognize multiple pages as a group to be processed as one message using the reference number, and may assemble pieces of data of the message body area according to an order indicated by the sequence number.

According to the various embodiments, locations of message header areas may be different from each other between a 3rd generation partnership project (3GPP) communication network and a 3GPP2 communication network, but the electronic device 100 may determine what encoding type has been used to encode a current page in a transport protocol data unit (TPDU). The encoding type for 3GPP2 may exist in the message body area 301, i.e., the user data, and the encoding type for 3GPP may exist in a data coding scheme area (not shown).

The control module 160 of the electronic device 100 may extract data of the undefined area 313 included in the page 310 to store the extracted data in the memory 181, and may combine the extracted data with data of the undefined area 322 included in the page 320 to perform character processing. Furthermore, the control module 160 of the electronic device 100 may insert a processed character while processing data of the defined area 312 and data of the defined area 323, so as to perform message restoration.

Figure 4:
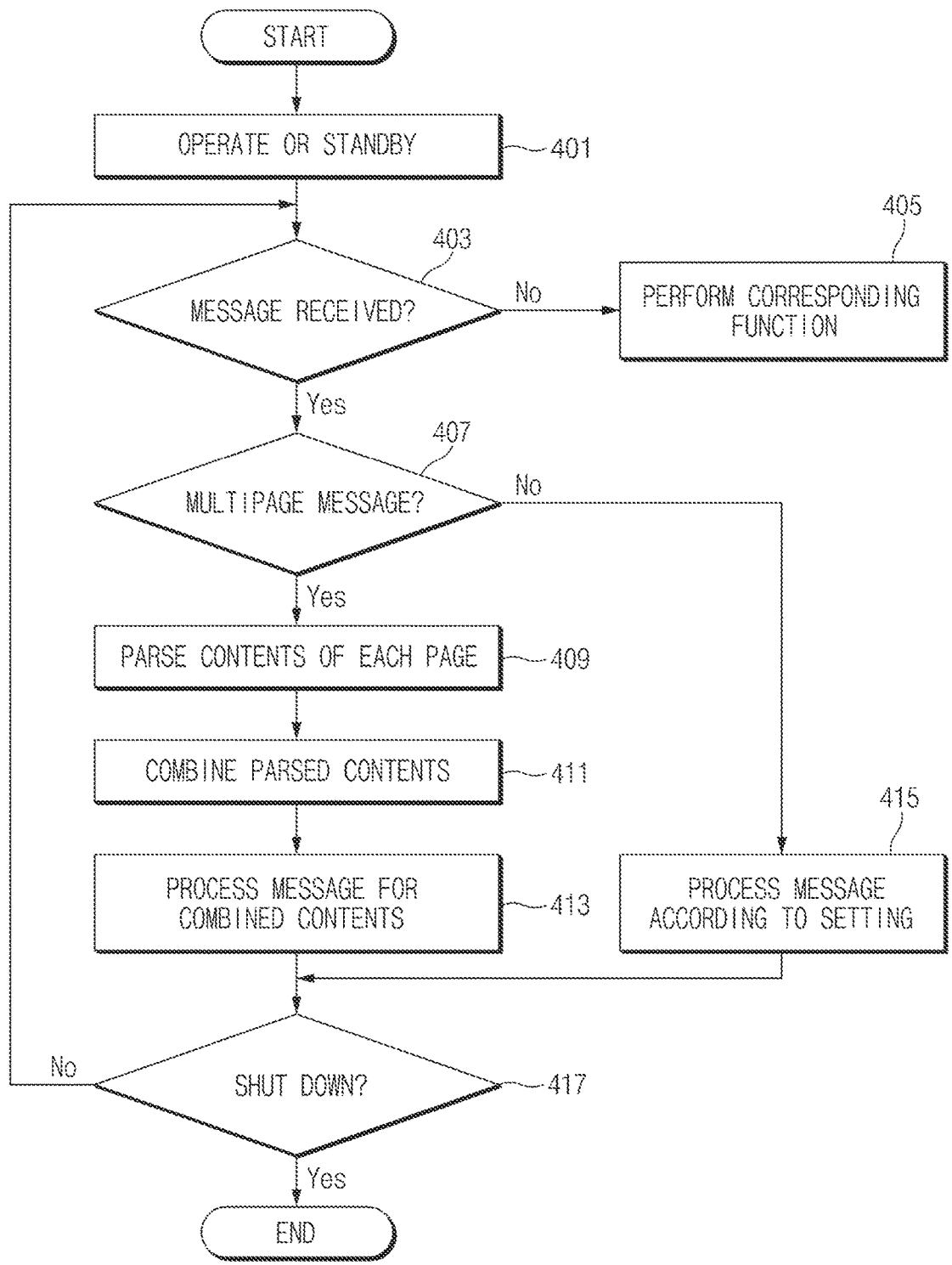
FIG. 4 is a flowchart illustrating a message processing method based on message content combination and extraction according to an embodiment of the present disclosure.

FIG. 4 is a flowchart illustrating a message processing method based on message content combination and extraction according to an embodiment of the present disclosure.

Referring to FIG. 4, according to a message processing method according to an embodiment, the control module 160 of the electronic device 100 may allow the electronic device 100 to operate or to be in a standby mode, in operation 401. In operation 401, the control module 160 may enable the communication interface 110 to may maintain a message reception standby state.

The control module 160 may check and/or determine whether an event related to message reception occurs, or in other words, may determine whether a message is received, in operation 403. If an event related to message reception does not occur in operation 403, the control module 160 may proceed to operation 405 to control performance of a corresponding function according to the type of an event that occurs. Alternatively, if an event does not occur, the control module 160 may allow a previous operation state to be maintained, or may control entry to a sleep mode, e.g., a mode for turning off the display module 140.

If message reception occurs in operation 403, the control module 160 may check and/or determine whether a received message is a multipage message, and/or includes a plurality of pages, in operation 407. If the received message is not the multipage message, as determined in operation 407, the control module 160 may perform message conversion processing according to a setting in operation 415.

If the received message is determined to be the multipage message in operation 407, the control module 160 may parse the contents of each page in operation 409. For example, the control module 160 may extract data arranged in the message body area of each page. The control module 160 may combine the parsed contents in operation 411. For example, the control module 160 may sequentially arrange the data extracted from the message body area of each page in the memory 181. During a combining process, the control module 160 may combine data of an undefined area.

The control module 160 may perform message conversion processing on combined contents, or in other words, may process the multipage message for the combined contents, in operation 413. The control module 160 may convert the data sequentially arranged in the memory 181 into a string according to a corresponding order.

The control module 160 may check and/or determine whether an event related to shutting down occurs in operation 417. If an event related to shutting down occurs in operation 417, the control module 160 may control shutting down of the electronic device 100 and control termination of a function related to message conversion processing. If the event related to the shutting down does not occur in operation 417, the process may return to operation 403 so that the control module 160 re-performs operation 403 and the following operations.

Figure 5:
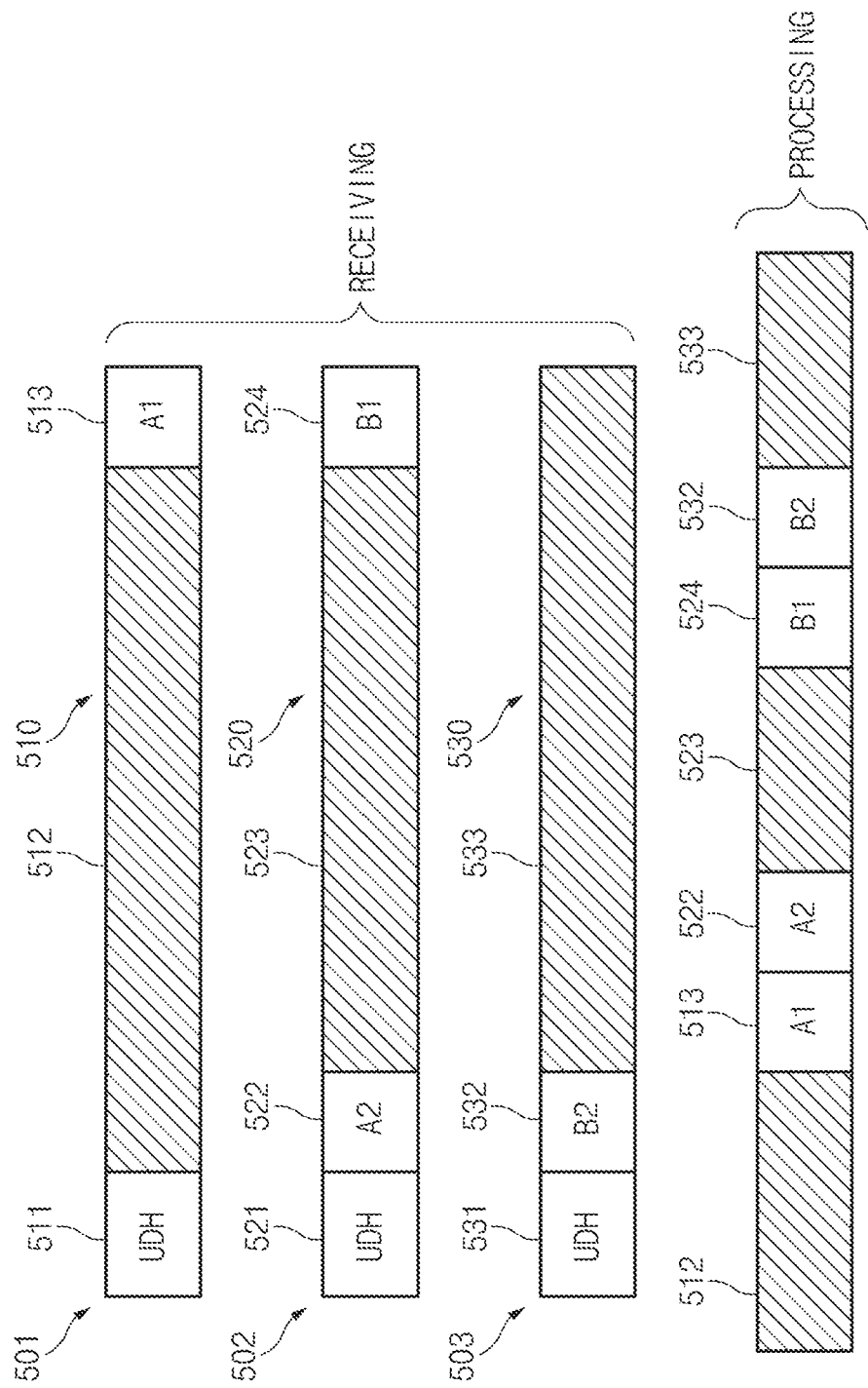
FIG. 5 is a diagram illustrating multipage processing based on message content combination and extraction according to an embodiment of the present disclosure.

FIG. 5 is a diagram illustrating multipage processing based on message content combination and extraction according to an embodiment of the present disclosure.

Referring to FIG. 5, the electronic device 100 may receive a message including a page 501, a page 502 and a page 503. The page 501 may include a message header area 511 and a message body area 510. The message body area 510 may include a defined area 512, where defined code data is arranged, and an undefined area 513, where undefined code data is arranged at a certain lower area of the page, e.g., a lowermost two bytes.

The page 502 may include a message header area 521 and a message body area 520. The message body area 520 may include an undefined area 522, where undefined data is arranged at a certain upper area of the page, e.g., an uppermost two bytes of the page, a defined area 523, where defined code data is arranged, and an undefined area 524, where undefined code data is arranged at a lower area of the page.

The page 503 may include a message header area 531 and a message body area 530. The message body area 530 may include an undefined area 532, where undefined data is arranged at a certain upper area of the page, and a defined area 533, where defined code data is arranged.

The control module 160 of the electronic device 100 may extract, from the received page 501, the data of the defined area 512 and the data of the undefined area 513. The control module 160 may store the extracted data of the defined area 512 and the undefined data 513 in the memory 181. The control module 160 may extract, from the received page 502, the data of the undefined area 522, the data of the defined area 523 and the data of the undefined area 524. The control module 160 may store the extracted data of the undefined area 522, the defined area 523, and the undefined area 524 in the memory 181. In this operation, the control module 160 may allow the data of the page 502 to be successively arranged following the data of the defined area 512 and the data of the undefined area 513 previously stored in the memory 181.

The control module 160 may extract, from the received page 503, the data of the undefined area 532 and the data of the defined area 533. The control module 160 may sequentially arrange the extracted data of the undefined area 532 and the defined area 533 in the memory 181 in which the data of the page 502 is stored.

As illustrated in FIG. 5, the control module 160 may integrate and/or combine the extracted pieces of data. For example, the control module 160 may arrange the pieces of data in the order of the data of the defined area 512, the data of the undefined area 513, the data of the undefined area 522, the data of the defined area 523, the data of the undefined area 524, the data of the undefined area 532 and the data of the undefined area 533 in the memory 181. The control module 160 may perform processing, such as message conversion, on the combined data. For example, the control module 160 may perform message conversion on the data of the defined area 512, and then may combine the data of the undefined area 513 and the data of the undefined area 522 to perform message conversion on the data combined. The control module 160 may perform message conversion on the data of the defined area 523, and then may combine the data of the undefined area 524 and the data of the undefined area 532 to perform message conversion on the combined data.

The control module 160 may allow converted messages to be output to the display module 140 and/or stored in the storage module 150.

Figure 6:
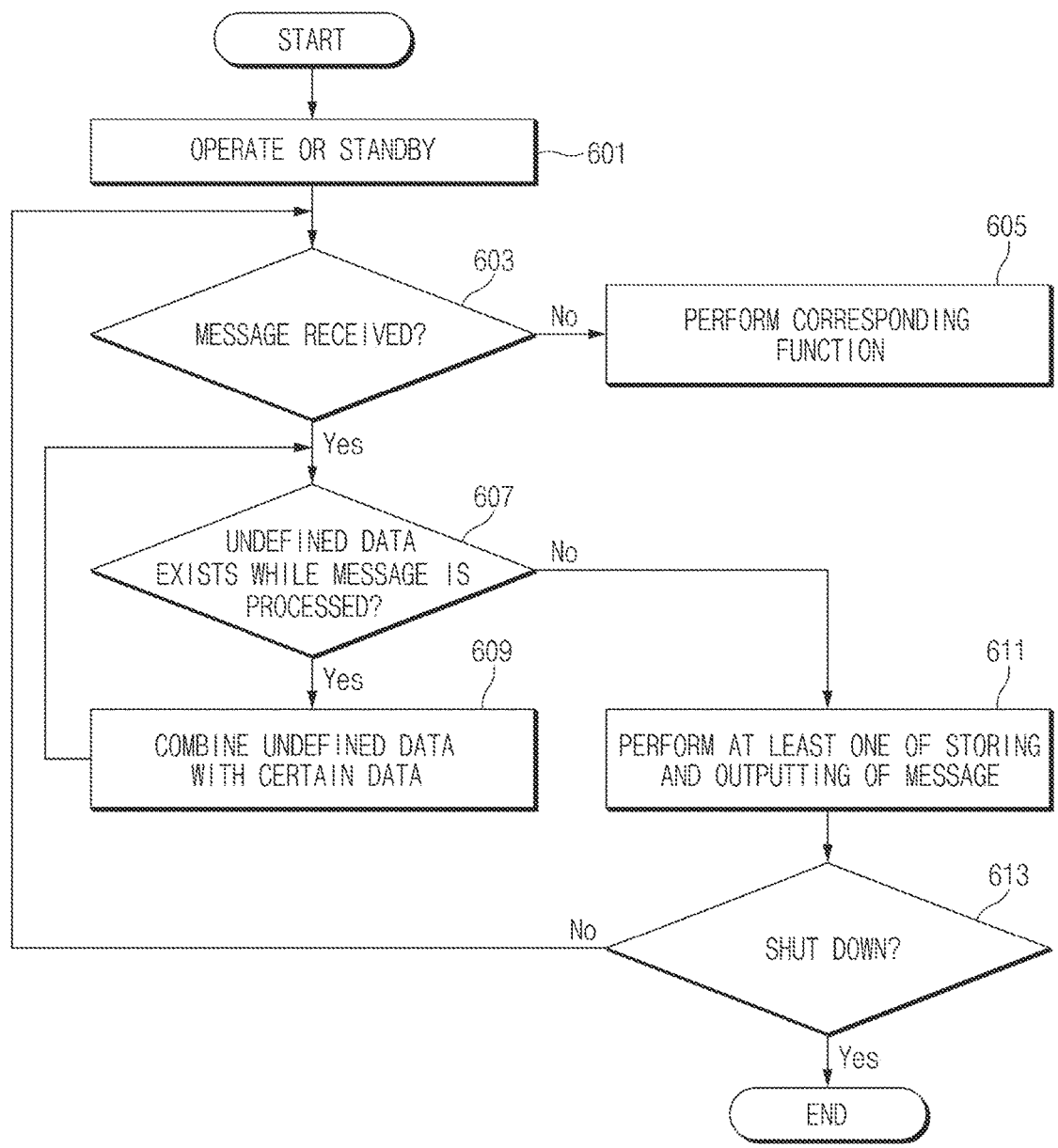
FIG. 6 is a flowchart illustrating a message processing method based on message conversion according to an embodiment of the present disclosure.

FIG. 6 is a flowchart illustrating a message processing method based on message conversion according to an embodiment of the present disclosure.

Referring to FIG. 6, according to a message processing method according to an embodiment, the control module 160 of the electronic device 100 may allow the electronic device 100 to operate or to be in standby mode, in operation 601. In this operation, the control module 160 may control the communication interface 110 so that the communication interface 110 is able to receive a message.

The control module 160 may check and/or determine whether an event related to message reception occurs, or in other words, may determine whether a message is received, in operation 603. If an event related to message reception does not occur in operation 603, the control module 160 may proceed to operation 605 to control performance of a corresponding function according to the type of an event that occurs. Alternatively, if an additional event does not occur, the control module 160 may allow a previous operation state to be maintained, or may control entry to a sleep mode, e.g., a mode for turning off the display module 140.

If message reception is determined to occur in operation 603, the control module 160 may check and/or determine whether undefined data exists, or in other words, may detect whether undefined data exists, while performing message conversion processing in operation 607. If the undefined data is detected while performing message conversion processing in operation 607, the control module 160 may combine the undefined data with certain data and then may process the combined data in operation 609. In this operation, the control module 160 may temporarily store the undefined data in the memory 181 and then may read data of a next page. If undefined data exists in a certain upper area of the next page, the control module 160 may combine the undefined data with the undefined data of the previous page stored in the memory 181. The control module 160 may perform string conversion on the combined undefined data.

After combining the undefined data, the control module 160 may proceed to operation 607 to re-perform operation 607 and the following operations. According to the various embodiments, if a lowermost part of a received message includes undefined data, and no data exists thereafter, the control module 160 may perform error handling on the undefined data, e.g., allocating a determined specific character corresponding to the undefined data, and then may proceed to operation 611.

If undefined data does not exist in operation 607, the control module 160 may complete the message conversion processing, and then may perform at least one of storing and outputting a converted message in operation 611.

The control module 160 may check and/or determine whether an event related to shutting down occurs in operation 613. If an event related to shutting down occurs in operation 613, the control module 160 may control shutting down of the electronic device 100 and termination of a function related to message conversion processing. If the event related to the shutting down does not occur in operation 613, the process may return to operation 603 so that the control module 160 re-performs operation 603 and the following operations.

Figure 7:
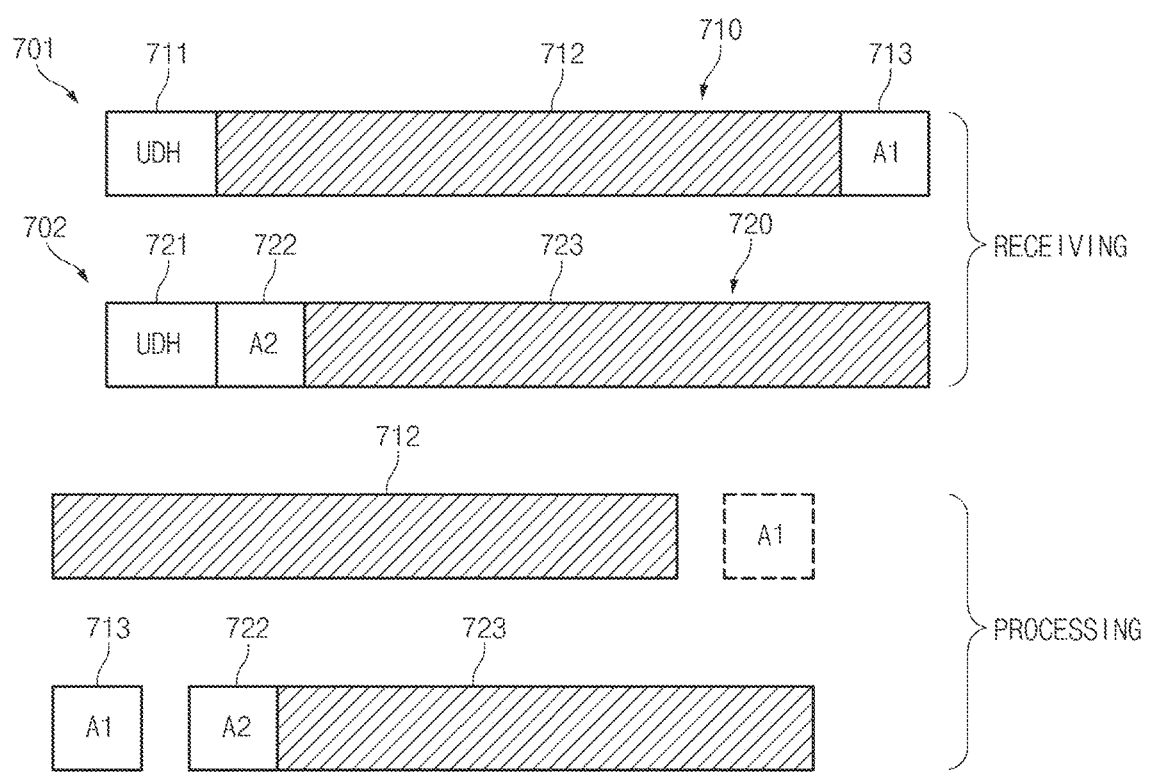
FIG. 7 is a diagram illustrating multipage processing based on message conversion processing according to an embodiment of the present disclosure.

FIG. 7 is a diagram illustrating multipage processing based on message conversion processing according to an embodiment of the present disclosure.

Referring to FIG. 7, the electronic device 100 may receive a message including a page 701 and a page 702. The page 701 may include a message header area 711 and a message body area 710. The message body area 710 may include a defined area 712, where defined code data is arranged, and an undefined area 713, where undefined code data is arranged. The page 702 may include a message header area 721 and a message body area 720. The message body area 720 may include an undefined area 722, where undefined code data is arranged, and a defined area 723, where defined code data is arranged.

The control module 160 of the electronic device 100 may check the header area 711 of the page 701 to determine that the page is a part of a multipage message. The control module 160 of the electronic device 100 may perform message conversion processing on the message body area 710. For example, the control module 160 may read data from an upper data area of the message body area 710 in units of a certain number of bits or bytes, e.g., a data size unit that defined by an encoding type in the message header area, and may perform message conversion processing, e.g., string generation on the read data.

According to the various embodiments, the control module 160 may check and/or determine code information applied to received messages using the message header area. The control module 160 may read each data of the message body area 710 on the basis of a character writing data size defined by the code information, e.g., four bytes in the case of applying UTF-16 code information, and may perform message conversion processing corresponding to the read data. For example, the control module 160 may perform message conversion processing on the data of the defined area 712 for every four bytes of the data.

After the message conversion processing for the data of the defined area 712 is completed, the control module 160 may discover and/or determine that the data of the undefined area 713 is undefined data while performing message conversion processing on the data of the undefined area 713. If the data of the undefined area 713 is undefined data, the control module 160 may combine data of a certain upper area of the page 702, e.g., the data of the undefined area 722, with the data of the undefined area 713 to perform message processing. Thereafter, the control module 160 may perform message processing on the data of the defined area 723. In this operation, the control module 160 may store the data of the undefined area 713 in the memory 181, and may combine the data of the undefined area 722 of a next page with the data stored in the memory 181 to perform character processing. Thereafter, the control module 160 may perform message processing on the data of the defined area 723.

The control module 160 may allow converted messages to be output to the display module 140 or stored in the storage module 150.

Figure 8:
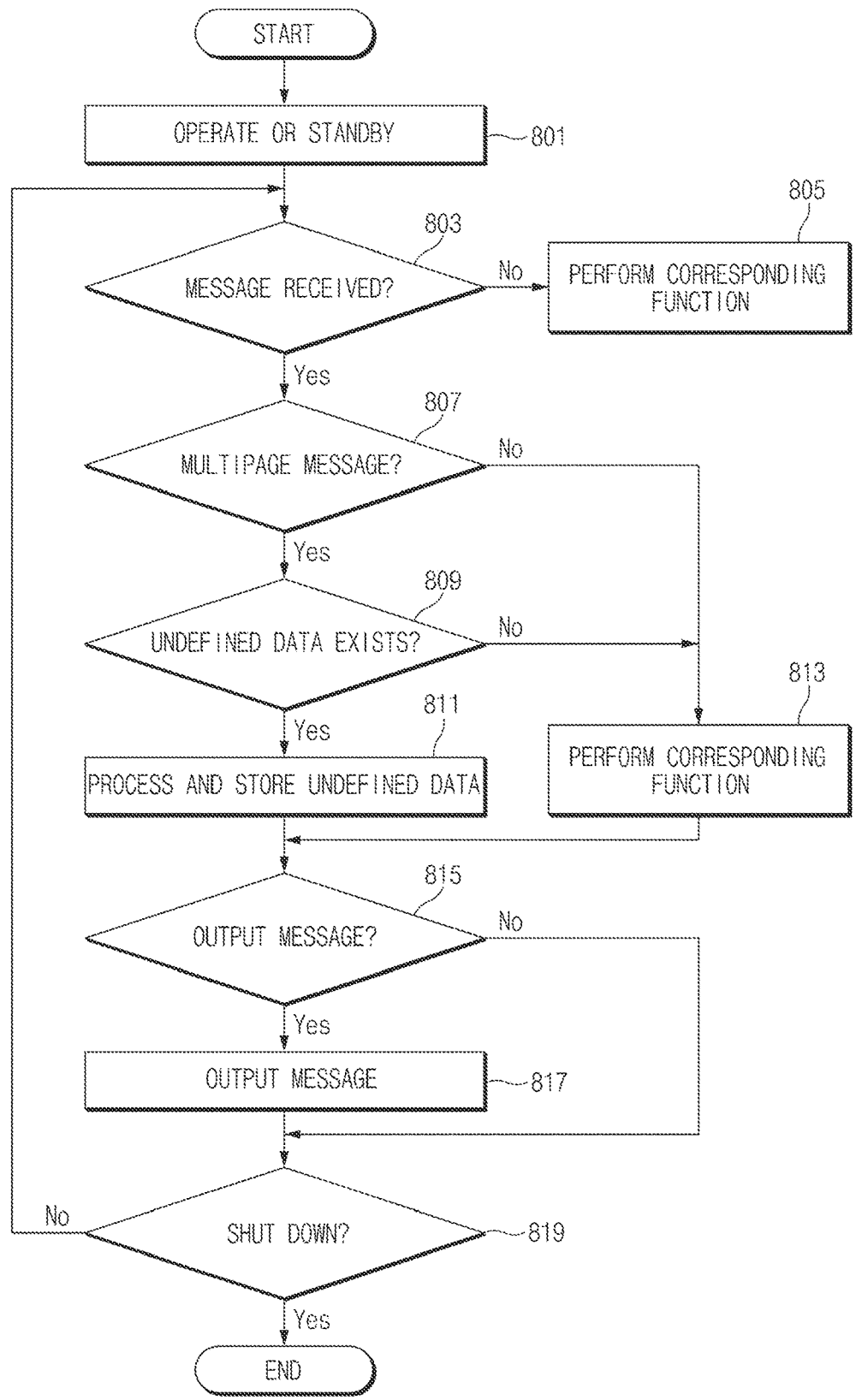
FIG. 8 is a flowchart illustrating a message processing method based on multipage checking according to an embodiment of the present disclosure.

FIG. 8 is a flowchart illustrating a message processing method based on multipage checking according to an embodiment of the present disclosure.

Referring to FIG. 8, according to a message processing method according to an embodiment, the control module 160 of the electronic device 100 may allow the electronic device 100 to operate or to be in a standby mode, in operation 801. In this operation, the control module 160 may maintain power supply and a camping-on process of the communication interface 110. The control module 160 may check and/or determine whether an event related to message reception occurs, or in other words, if a message is received, in operation 803.

If an event related to message reception does not occur in operation 803, the control module 160 may proceed to operation 805 to control performance of a corresponding function according to the type of an event that occurs. Alternatively, if an additional event does not occur, the control module 160 may allow a previous operation state to be maintained, or may control entry to a sleep mode, e.g., a mode for turning off the display module 140.

If message reception occurs in operation 803, the control module 160 may check and/or determine whether a received message is a multipage message in operation 807. The control module 160 may check and/or determine a header area of the received message to determine whether a reference number indicates a plurality of pages. Alternatively, the control module 160 may check and/or determine whether a UDH that is arranged only for a multipage message exists to determine whether a multipage message is received.

If the received message is a multipage message, the control module 160 may check and/or determine whether undefined data exists in the received message in operation 809. For example, the control module 160 may check and/or determine whether data of a predefined certain area of the message body area is undefined data. Here, the predefined certain area may vary with a message type, e.g., the size of the message body area, or the size of data, such as code information, allocated to each character and/or icon include in message contents. If undefined data exists in the message contents, the control module 160 may process and store the undefined data in operation 811. For example, the control module 160 may combine the undefined data to perform single character processing, and may insert the undefined data to the remaining message contents to perform message restoration. The control module 160 may store a received multipage message in the storage module 150. Here, the control module 160 may perform notification of message reception.

If the received message is determined to be not a multipage message in operation 807, the control module 160 may proceed to operation 813 to perform a message-related function, that is, to perform a corresponding function. For example, the control module 160 may read data for each size of a certain number of bits or bytes according to a message conversion type, e.g., an encoding type, in the message header area of a single page, and may output a string mapped to the read data.

If undefined data does not exist in the received message in operation 809, the control module 160 may proceed to operation 813 to perform the message-related function. The control module 160 may check and/or determine the message header area of a first page of a multipage to check and/or determine encoding information, and may control string conversion on the basis of the encoding information.

The control module 160 may check and/or determine whether an event related to message output occurs, or in other words if an output message exists, in operation 815. If an event related to message output occurs in operation 815, the control module 160 may perform message output in operation 817. If an event related to message output does not occur in operation 815, the control module 160 may skip operation 817.

The control module 160 may check and/or determine whether an event related to shutting down of the electronic device 100 occurs in operation 819. If an event related to shutting down occurs in operation 819, the control module 160 may control shutting down of the electronic device 100 and termination of a function related to message conversion processing. If the event related to the shutting down does not occur in operation 819, the process may return to operation 803 so that the control module 160 re-performs operation 803 and the following operations.

Figure 9:
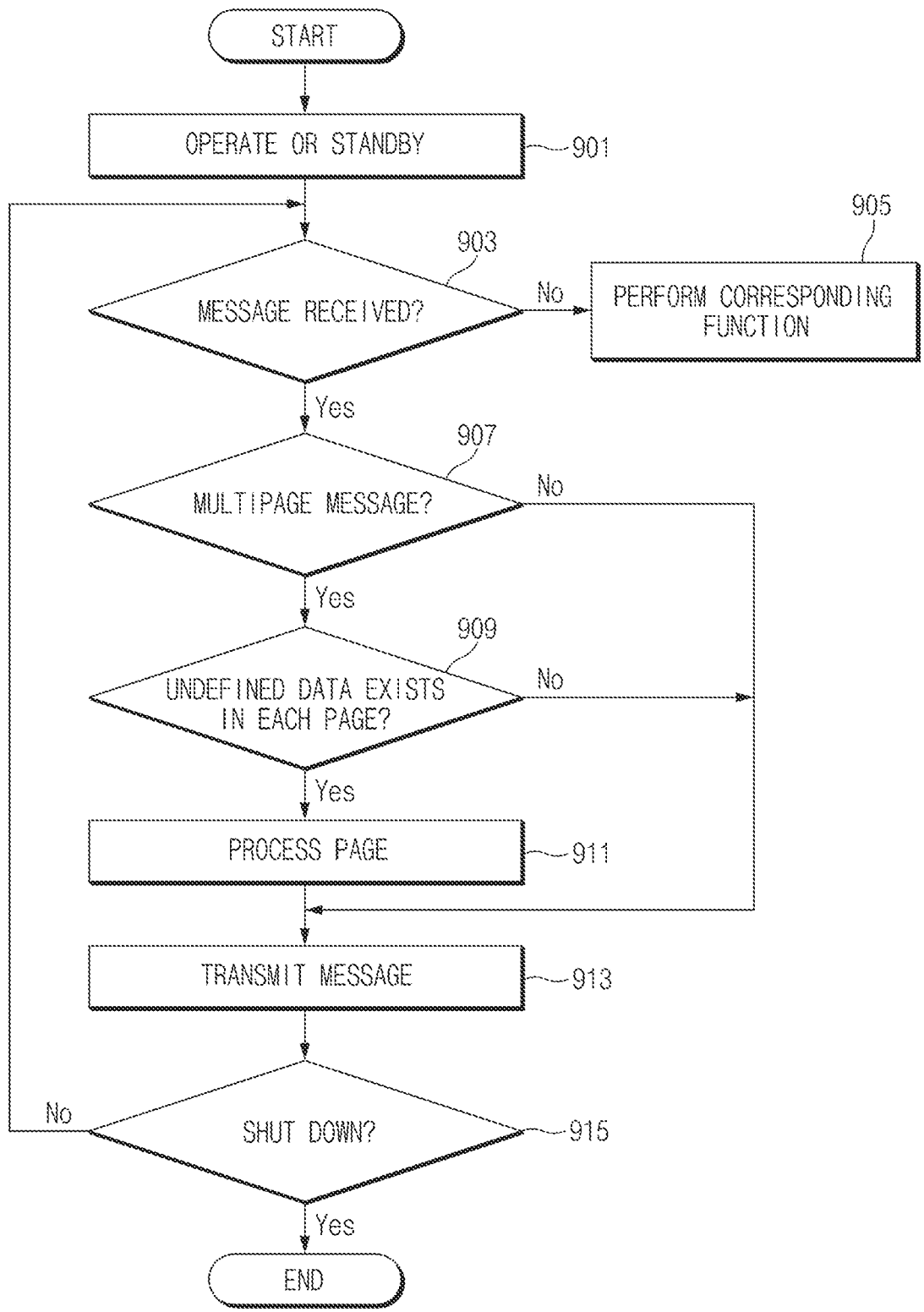
FIG. 9 is a flowchart illustrating a message processing method related to message transmission according to an embodiment of the present disclosure.

FIG. 9 is a flowchart illustrating a message processing method related to message transmission according to an embodiment of the present disclosure.

Referring to FIG. 9, according to a message processing method according to an embodiment, the control module 160 of the electronic device 100 may allow, i.e., control, the electronic device 100 to operate or to be in a standby mode, in operation 901. The control module 160 may check and/or determine whether an event related to message transmission occurs, or in other words, if a message is received, in operation 903. If an event related to message transmission does not occur in operation 903, the control module 160 may proceed to operation 905 to control performance of a corresponding function according to the type of an event that occurs. Alternatively, if an additional event does not occur, the control module 160 may allow a previous operation state to be maintained, or may control entry to a sleep mode, e.g., a mode for turning off the display module 140.

If an event related to message transmission occurs in operation 903, the control module 160 may perform processing related to message transmission. For example, the control module 160 may control a function of outputting a message writing window, a function of inputting a character corresponding to a user input received through a virtual input keypad or a physical keypad, and a function of outputting the character to the display module 140. If message transmission is requested after inputting a phone number and/or phonebook information of the other electronic device 101, the control module 160 may check and/or determine whether a message to be transmitted is a multipage message in operation 907.

If the message to be transmitted is a multipage message, the control module 160 may check and/or determine whether undefined data exists in each page in operation 909. If undefined data exists in each page in operation 909, the control module 160 may perform page processing in operation 911. According to an embodiment, the control module 160 may extract undefined data arranged in a specific page to arrange the extracted undefined data in a certain upper area of a next page. The control module 160 may transmit the message that has undergone the page processing to the other electronic device 101 in operation 913.

The control module 160 may check and/or determine whether an event related to shutting down of the electronic device 100 occurs in operation 915. If an event related to shutting down occurs in operation 915, the control module 160 may control shutting down of the electronic device 100 and/or termination of a function related to message conversion processing. If the event related to the shutting down does not occur in operation 915, the process may return to operation 903 so that the control module 160 re-performs operation 903 and the following operations.

According to the various embodiments, in a case where a multipage message is created by a user input to a message writing window so that a data size of the multipage message is larger than a determined certain size, e.g., a size of a certain number of bytes defined by a message standard, the control module 160 may check and/or determine whether undefined data exists. For example, the control module 160 may check and/or determine whether the size of a certain lower area of a specific page is equal to or larger than that of data to be written. According to the various embodiments, the control module 160 may check and/or determine whether the size of data to be written by a user input is larger than that of the certain area, like multi-Unicode data, while the certain lower area of the specific page is available.

In a case where the size of the certain lower area of the specific page is smaller than that of the data to be written, the control module 160 may write the data to be written, e.g., the multi-Unicode data, in an upper area of a next page. The control module 160 may discard a message body area in which data is not written or may write specific information, (e.g., space data, therein. In the case of discarding the area in which data is not written, the control module 160 may change a definition for the message body area of the message header area. For example, if the total size of the message body area is 140 bytes, and 138 bytes of data is written in the message body area, the number 138 may be written as size information of the message body area in the message header area.

According to the various embodiments, in a case of a multipage message based on a UTF-16 coding scheme, if a lowermost two bytes of a specific page fall within a Unicode surrogate range, the control module 160 may fill the two byte area with a space. According to the various embodiments, if the lowermost two bytes of a specific page fall within a Unicode surrogate range, the control module 160 may fill the two byte area with a carriage return or line feed. According to the various embodiments, if the lowermost two bytes of a specific page fall within a Unicode surrogate range, the control module 160 may indicate existence of a UTF-32 character in a UDH, and may support message conversion, e.g., decoding, of the other electronic device 101 so that the UTF-32 character is detected by reading a corresponding value and decoding is performed normally.

If a user inputs one of UTF-32 character strings, the control module 160 may output a warning message using at least one of the display module 140 and the audio module 130, and may provide a guide to induce the user to use another service, e.g., at least one of SMS, multimedia messaging service (MMS), social networking service (SNS), and a chatting channel). According to the various embodiments, in the case where specific character code information, e.g., data that uses a multibyte to display one piece of information such as UTF-32, should be written in a boundary region of multiple pages, for example, a certain lower area of a current page and a certain upper area of a next page, the control module 160 may allow a warning message to be output using at least one of the display module 140 and the audio module 130. For example, the display module 140 may output a message for requesting input of other data, data that uses a single byte, or may output a message for notifying that pages may increase due to a multibyte input.

According to the various embodiments, the control module 160 may request a user to confirm whether to convert multibyte Unicode-type data, e.g., an Emoji, into a specific code type, e.g., a 7BIT SMILEY, to achieve the compatibility. Upon receiving a response to the request for confirmation, the control module 160 may match undefined data to a code table, e.g., a SMILEY TABLE, installed in the electronic device 100 to perform message processing.

Figure 10:
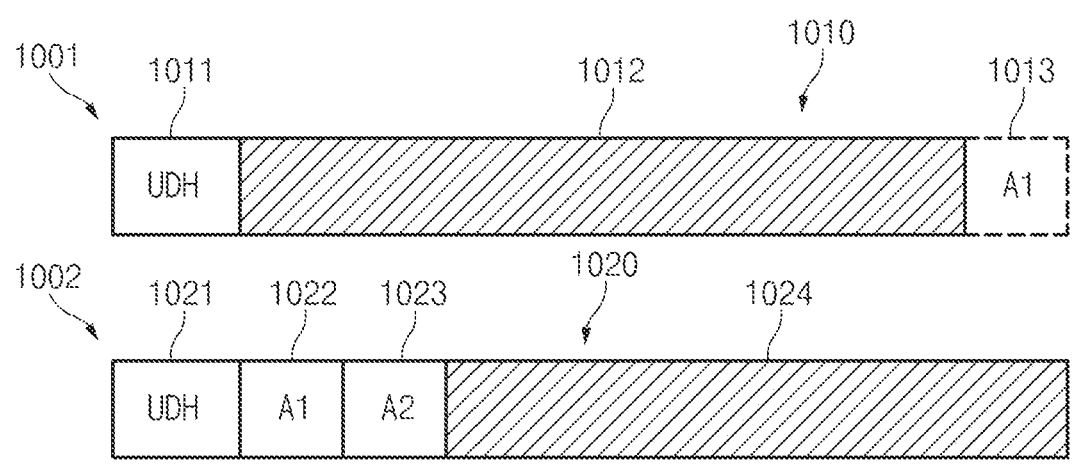
FIG. 10 is a diagram illustrating message processing related to message transmission according to an embodiment of the present disclosure.

FIG. 10 is a diagram illustrating message processing related to message transmission according to an embodiment of the present disclosure.

Referring to FIG. 10, if a message to be transmitted is a multipage message, with a multipage and/or a plurality of pages, including a page 1001 and a page 1002, the control module 160 may check and/or determine whether undefined data is included in the pages.

Here, the page 1001 may include a message header area 1011 and a message body area 1010. The page 1002 may include a message header area 1021 and a message body area 1020. The message body area 1010 may include a defined area 1012 and an undefined area 1013, to and/or from which specific information, e.g., space, line feed, carriage return, etc., is written and/or removed. If data exists in the undefined area 1013, as illustrated in the message body area 1010 to be transmitted, the control module 160 may extract the data of the undefined area 1013.

The control module 160 may arrange the extracted data of the undefined area 1013 in a certain area 1022 of the page 1002. For example, the control module 160 may arrange the extracted data of the undefined area 1013 at a front of an undefined area 1023 of the page 1002. In relation to this operation, the control module 160 may shift data of the undefined area 1023 and data of a defined area 1024 by as much as a certain data area size, for example, the size of the undefined area 1013, within the message body area 1020. Accordingly, the control module 160 may successively arrange the data of the undefined area 1013 and the data of the undefined area 1023 and may arrange the extracted data of the undefined area 1013 to be in the certain area 1022. Such an operation may be performed while the message to be transmitted is generated on the basis of user data input by a user using a message application. For example, if user data that needs generation of a multipage is received from the message application, the control module 160 may check and/or determine whether multibyte code-type data is arranged in a certain area of the received data, e.g., a boundary area of a page defined by a message standard. If the multibyte code-type data is arranged in the boundary area, the control module 160 may perform the above-mentioned operation so that the data is written as defined data completely instead of being written as undefined data. Here, the control module 160 may arrange some data arranged on a boundary area between pages in an upper area of a next page.

In the above-mentioned process, if the size of the entire message contents exceeds the size of the message body area 1020 due to addition of data to the undefined area 1013 into the certain area 1022, the control module 160 may generate a new page 1003 to write a certain amount of data in the page 1003. If the operation for successively arranging data of an undefined area is completed, the control module 160 may control the message to be transmitted to the other electronic device 101.

According to the various embodiments, the display module 160 may perform real-time processing when user data is input to write a message. For example, when the control module 160 writes data in a message body area in the order of input of user data, if the data being written arrives at a certain lower area of the message body area, the control module 160 may check and/or determine whether only a part of multibyte code-type data is written in the area, and is thus undefined. In the case where only a part of data should be written in the corresponding area, the control module 160 may newly generate a page and may write data corresponding to a single character, icon and/or image in the generated page. Here, before generating the page, the control module 160 may output a guide on whether to change a code type and a warning message for notifying that multipage generation is needed.

Figure 11:
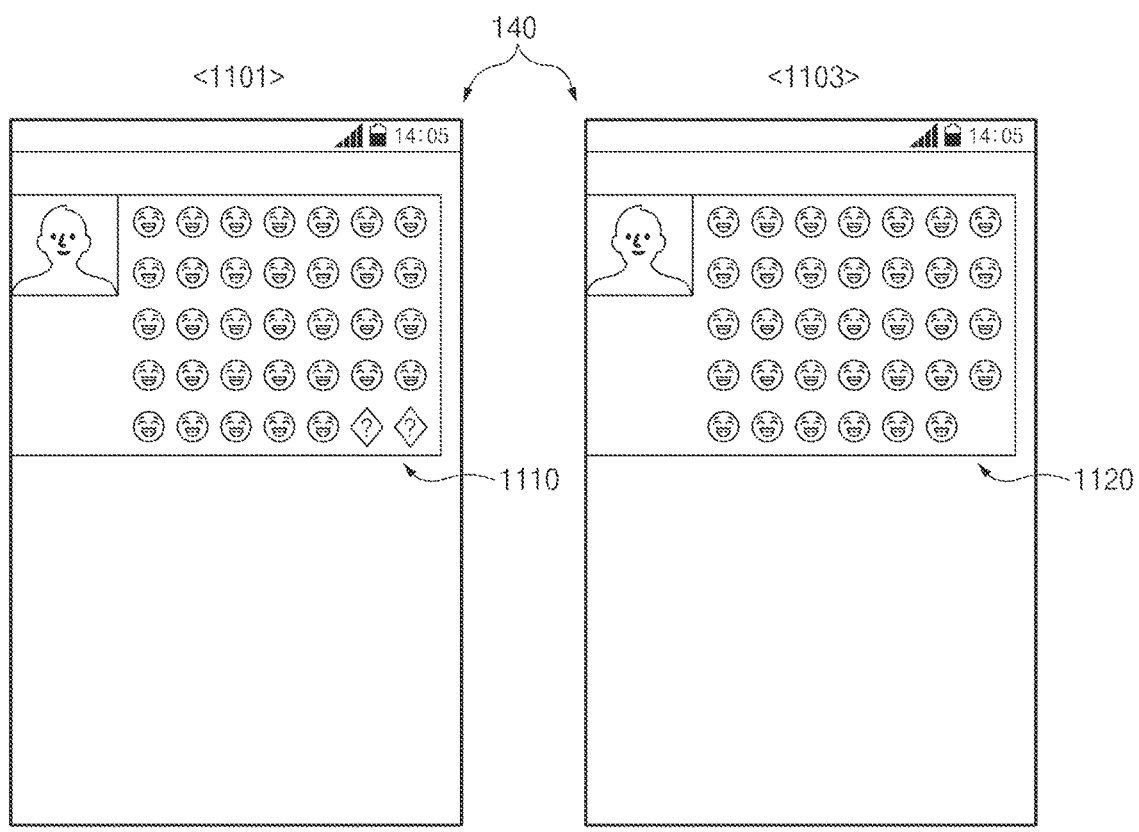
FIG. 11 is a diagram illustrating a message reception screen interface of an electronic device according to an embodiment of the present disclosure.

FIG. 11 is a diagram illustrating a message reception screen interface of an electronic device according to an embodiment of the present disclosure.

Referring to FIG. 11, a state 1101 indicates that an error occurs with respect to a message since data of an undefined area, that is, undefined data, is not processed. For example, if the undefined data is not processed normally, a message error area 1110 may be output to the display module 140. For example, the message error area 1110 may output a plurality of message errors due to a plurality of pieces of undefined data.

A state 1103 indicates that an error does not occur since data of an undefined area is processed. As illustrated in the drawing, a message 1120 without an error may be output. Since pieces of undefined data are processed with a single character, image, emoticon and/or icon, the message 1120 having characters fewer by one than those of the message error area 1110 may be output to the display module 140.

Each of the above-mentioned elements of an electronic device according to various embodiments the present disclosure may be configured with one or more components, and the names of the elements may be changed according to the type of the electronic device. The electronic device according to the present disclosure may include at least one of the above-mentioned elements, and some elements may be omitted and/or other additional elements may be added. Furthermore, some of the elements of the electronic device according to the present disclosure may be combined with each other so as to form one entity, so that the functions of the elements may be performed in the same manner as before the combination.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" according to the present disclosure may include at least one of an application-specific integrated circuit (ASIC) chip, a field-programmable gate array (FPGA), and a programmable-logic device for performing some operations, which are known or will be developed.

According to the various embodiments, at least a part of devices, e.g., modules and/or functions thereof, and/or methods, e.g., operations, according to the present disclosure may be implemented instructions stored in a non-transitory computer-readable storage medium in the form of a programming module. In a case where the instructions are performed by at least one processor, e.g., the processor 210, the at least one processor may perform functions corresponding to the instructions. The non-transitory computer-readable storage medium may be, for example, the memory 120. At least a part of the programming module may be implemented, e.g., executed, by the processor. At least a part of the programming module may include, for example, a module, program, routine, sets of instructions, or process for performing at least one function.

The non-transitory computer-readable storage medium may include a magnetic medium such as a hard disk, a floppy disk and a magnetic tape, an optical medium such as a compact disk read only memory (CD-ROM) and a digital versatile disc (DVD), a magneto-optical medium such as a floptical disk, and a hardware device configured to store and execute program instructions, e.g., programming module, such as a read only memory (ROM), a random access memory (RAM) and a flash memory. The program instructions may include machine language codes made by compilers and high-level language codes that can be executed by computers using interpreters. The above-mentioned hardware may be configured to be operated as one or more software modules for performing operations of the present disclosure and vice versa.

The module and/or programming module according to the present disclosure may include at least one of the above-mentioned elements, and/or some elements may be omitted and/or other additional elements may be added. Operations performed by the module, the programming module or the other elements may be performed in a sequential, parallel, iterative and/or heuristic way. Furthermore, some operations may be performed in another order or may be omitted, or other operations may be added.

The term "include," "comprise," "including," or "comprising" used herein indicates disclosed functions, operations, or existence of elements but does not exclude other functions, operations or elements. It should be further understood that the term "include", "comprise", "have", "including", "comprising", or "having" used herein specifies the presence of stated features, numbers, steps, operations, elements, components, or combinations thereof but does not preclude the presence or addition of one or more other features, numbers, steps, operations, elements, components, or combinations thereof.

The meaning of the term "or" used herein includes any combination of words connected by the term "or". For example, the expression "A or B" may indicate A, B, or both A and B.

The terms such as "first", "second", and the like used herein may refer to various elements of various embodiments, but do not limit the elements. For example, such terms do not limit the order and/or priority of the elements. Furthermore, such terms may be used to distinguish one element from another element. For example, without departing the scope of the various embodiments, a first element may be referred to as a second element and vice versa.

It will be understood that when an element is referred to as being "linked", "connected" or "coupled" to another element, it can be directly connected or coupled to the other element or intervening elements may be present. In contrast, when an element is referred to as being "directly connected" or "directly coupled" to another element, it should be understood that there are no intervening elements.

The terminology used herein is not for delimiting the various embodiments but for describing specific embodiments. The terms of a singular form may include plural forms unless otherwise specified.

The terms used herein, including technical or scientific terms, have the same meanings as understood by those skilled in the art unless otherwise defined herein. The commonly used terms such as those defined in a dictionary should be interpreted in the same context as in the related art and should not be interpreted in an idealized or overly formal sense unless otherwise defined explicitly.

Electronic devices according to the various embodiments may include at least one of smartphones, tablet personal computers (PCs), mobile phones, video telephones, electronic book readers, desktop PCs, laptop PCs, network computers, personal digital assistants (PDAs), portable multimedia players (PMPs), digital audio players, mobile medical devices, cameras, wearable devices, e.g., head-mounted-devices (HMDs) such as electronic glasses, electronic apparel, electronic bracelets, electronic necklaces, electronic appcessories, electronic tattoos, and smartwatches.

According to some embodiments, the electronic devices may be smart home appliances. The smart home appliances may include at least one of, for example, Televisions (TVs), DVD players, audios, refrigerators, air conditioners, cleaners, ovens, microwave ovens, washing machines, air cleaners, set-top boxes, TV boxes, e.g., Samsung HomeSync™, Apple TV™, or Google TV™, game consoles, electronic dictionaries, electronic keys, camcorders, and electronic picture frames.

According to some embodiments, the electronic devices may include at least one of medical devices, e.g., magnetic resonance angiography (MRA), magnetic resonance imaging (MRI), computed tomography (CT), scanners, and ultrasonic devices, navigation devices, global positioning system (GPS) receivers, event data recorders (EDRs), flight data recorders (FDRs), vehicle infotainment devices, electronic equipment for ship, e.g., navigation systems and gyrocompasses, avionics, security devices, head modules for vehicles, industrial or home robots, automatic teller's machines (ATMs), and points of sales (POSs).

According to various embodiments, the electronic devices may include at least one of parts of furniture or buildings/structures having communication functions, electronic boards, electronic signature receiving devices, projectors, and measuring instruments, e.g., water meters, electricity meters, gas meters, and wave meters. The electronic devices according to the various embodiments may be one or more combinations of the above-mentioned devices. Furthermore, the electronic devices according to the present disclosure may be flexible devices. It would be obvious to those skilled in the art that the electronic devices according to the various embodiments are not limited to the above-mentioned devices.

As described above, according to a message processing method and the electronic device supporting the same according to the various embodiments, an error does not occur while a text message including at least a certain amount of data input by a user is converted into a multipage.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a communication interface;
a display;
a memory storing instructions; and
at least one processor configured to execute the stored instructions to:
control the communication interface to receive a message including a plurality of pages,
combine undefined data contained in a specific page of the plurality of pages with at least a part of data contained in a next page that is sequential to the specific page, and
control the display to display the combined data in the specific page or the next page,
wherein the combined data is defined by a given code type as a single character and the undefined data is not defined by the given code type as any character.

2. The electronic device according to claim 1, wherein the at least one processor is further configured to determine whether the undefined data is data written in a certain lower area of the specific page or is data written in a certain upper area of the specific page.

3. The electronic device according to claim 1,
wherein the at least one processor is further configured to determine a data conversion size using data conversion information applied to the specific page of the plurality of pages, and
wherein the at least one processor is further configured to determine whether the undefined data exists in a certain area of the specific page of the plurality of pages according to the data conversion size information.

4. The electronic device according to claim 3,
wherein the at least one processor is further configured to determine a size of largest data constituting a single character using the data conversion size information, and
wherein the at least one processor is further configured to assign a size of the certain area of the specific page of the plurality of pages according to the data size.

5. The electronic device according to claim 1,
wherein the at least one processor is further configured to convert content data of the plurality of pages including the combined data, and
wherein the at least one processor is further configured to allow a character string corresponding to the converted content data to be output.

6. The electronic device according to claim 5, wherein the memory is further configured to store the undefined data, and
wherein the at least one processor is further configured to combine certain data of the next page and the undefined data stored in the memory.

7. The electronic device of claim 1,
wherein the communication interface is further configured to receive the message having a type of the multipage message, and
wherein the at least one processor is further configured to extract content data from the multipage message and to continuously convert the extracted content data to perform message output.

8. An electronic device comprising:
a communication interface;
a display;
a memory storing instructions; and
at least one processor configured to execute the stored instructions to:
control the display to display a message including characters corresponding to user inputs,
receive a request for transmission of the message,
divide the message into a plurality of pages based on a given data size,
generate a multipage message by combining undefined data contained in a specific page of the plurality of pages with at least a part of data contained in a next page that is subsequent to the specific page, control the communication interface to transmit the multipage message including the combined data, wherein the combined data is defined by a given code type as a single character and the undefined data is not defined by the given code type as any character.

9. The electronic device according to claim 8, wherein the at least one processor is further configured to move, if the undefined data is contained, the undefined data to the next page, and wherein the at least one processor is further configured to blank a partial area of the specific page or write specific information in an area where the undefined data is written according to the movement of the undefined data.

10. The electronic device according to claim 8, wherein the at least one processor is further configured to write a message body size value of the specific page, which has been changed due to the combining with the undefined data, in a message header of the specific page.

11. A message processing method, the method comprising:

receiving a message including a plurality of pages;

combining undefined data contained in a specific page of the plurality of pages with at least a part of data contained in a next page that is subsequent to the specific page; and displaying the combined data in the specific page or the next page, wherein the combined data is defined by a given code type as a single character and the undefined data is not defined by the given code type as any character.

12. The method according to claim 11, wherein the determining of whether the undefined data is contained in the specific page includes at least one of:

determining whether data written in a certain lower area of the specific page is the undefined data; or determining whether data written in a certain upper area of the specific page is the undefined data.

13. The method according to claim 11, wherein the determining of whether the undefined data is contained in the specific page includes:

determining data size information of one character defined by at least one character code information contained in the specific page; and determining whether the undefined data is contained in the certain lower area of the specific page on the basis of the data size information.

14. The method according to claim 13, wherein the determining of whether the undefined data is contained in the specific page further includes:

determining character code information of largest data for one character in the at least one character code information contained in the specific page; and determining the certain area of the specific page within a value of the largest data.

15. The method according to claim 11, further comprising at least one of:

receiving a text message having a type of the received multipage message; or converting content data of the received multipage message including the combined at least part of the data to output a character string corresponding to the converted content data.

16. The method according to claim 15, further comprising:

temporarily storing the undefined data; and combining certain data of the next page with the undefined data that is temporarily stored.

17. The method according to claim 11, wherein the combining of the certain data of the next page with the undefined data includes moving the undefined data to the next page if the undefined data is contained.

18. The method according to claim 17, further comprising one of:

blanking a partial area of the specific page according to the movement of the undefined data; or writing specific information in an area where the undefined data is written.

19. The method according to claim 11, further comprising encoding the combined data.

20. The method according to claim 19, further comprising writing, in a message header, a size value of a message body changed due to the combining with the undefined data.

* * * * *